US010940574B2

(12) United States Patent
Chen

(10) Patent No.: US 10,940,574 B2
(45) Date of Patent: Mar. 9, 2021

(54) GRIP VISE

(71) Applicant: Chung Li Chen, Taichung (TW)

(72) Inventor: Chung Li Chen, Taichung (TW)

( * ) Notice: Subject to any disclaimer, the term of this patent is extended or adjusted under 35 U.S.C. 154(b) by 139 days.

(21) Appl. No.: 16/373,662

(22) Filed: Apr. 3, 2019

(65) Prior Publication Data

US 2019/0224815 A1 Jul. 25, 2019

(51) Int. Cl.
| | |
|---|---|
| *B25B 1/02* | (2006.01) |
| *B25B 1/08* | (2006.01) |
| *B25B 1/24* | (2006.01) |
| *B25B 5/02* | (2006.01) |
| *B25B 5/08* | (2006.01) |
| *B25B 5/16* | (2006.01) |
| *B25B 3/00* | (2006.01) |
| *F16B 2/18* | (2006.01) |
| *F16B 2/12* | (2006.01) |

(52) U.S. Cl.
CPC ............ *B25B 1/08* (2013.01); *B25B 1/02* (2013.01); *B25B 1/2489* (2013.01); *B25B 3/00* (2013.01); *B25B 5/02* (2013.01); *B25B 5/085* (2013.01); *B25B 5/163* (2013.01); *B25B 5/166* (2013.01); *F16B 2/12* (2013.01); *F16B 2/18* (2013.01)

(58) Field of Classification Search
CPC ........... B25B 1/08; B25B 1/02; B25B 1/2489; B25B 5/02; B25B 5/085; B25B 5/163; B25B 5/166; B25B 1/00; B25B 1/04; B25B 3/00; B25B 5/00; F16B 2/12; F16B 2/18
See application file for complete search history.

(56) References Cited

U.S. PATENT DOCUMENTS

| | | | |
|---|---|---|---|
| 2014/0284861 A1* | 9/2014 | Chen | B25B 5/068 269/216 |
| 2014/0300042 A1* | 10/2014 | Ursell | B25B 5/085 269/149 |
| 2015/0283679 A1* | 10/2015 | Ursell | B25B 5/166 269/149 |
| 2015/0298299 A1* | 10/2015 | Emerson | B25B 1/125 33/430 |

* cited by examiner

*Primary Examiner* — Daniel J Colilla

(57) ABSTRACT

A vise includes a stationary jaw at one end of a rail and including a moveable jaw member having a clamping surface, and a lever having a cam at one end engaged with the jaw member; and a moveable jaw on the rail and including a moveable member engaging with a limit member at the other end of the rail; a jaw element having one end secured to the moveable member and having a clamping surface at the other end, an internal moveable wedge secured to the clamping surface of the jaw element and having first and second inclined surfaces; two opposite arms pivotably secured to the moveable member wherein one ends of the arms contact each other and engage with the first and second inclined surfaces respectively, and each arm has a cavity on an outer edge; and two urging blocks complimentarily engaging the arms respectively.

1 Claim, 9 Drawing Sheets

GRIP VISE

BACKGROUND OF THE INVENTION

1. Field of the Invention

The invention relates to vises and more particularly to a grip vise having improved characteristics.

2. Description of Related Art

Conventional grip vises are disadvantageous due to inconvenience in use, complicated components and short useful life.

Thus, the need for improvement still exists.

SUMMARY OF THE INVENTION

It is therefore one object of the invention to provide a vise comprising a rail; a stationary jaw secured to one end of the rail and including a receptacle, a jaw member partially disposed in the receptacle and having a clamping surface, and a lever having a cam at one end engaged with an end of the jaw member; a limit member disposed at the other end of the rail; and a moveable jaw moveably disposed on the rail and including a moveable member engaging with the limit member in an inoperative position; a jaw element having one end secured to the moveable member and having a clamping surface at the other end, an internal moveable wedge secured to the clamping surface of the jaw element and having a first inclined surface and a second inclined surface; two opposite arms pivotably secured to the moveable member wherein one ends of the arms contact each other and engage with the first inclined surface and the second inclined surface respectively, and each arm has a cavity on an outer edge; and two urging blocks having a projection complimentarily engaging the cavity wherein an outer edge of each urging block engages either inner side surface of the rail.

The above and other objects, features and advantages of the invention will become apparent from the following detailed description taken with the accompanying drawings.

DETAILED DESCRIPTION OF THE INVENTION

Figure 1:
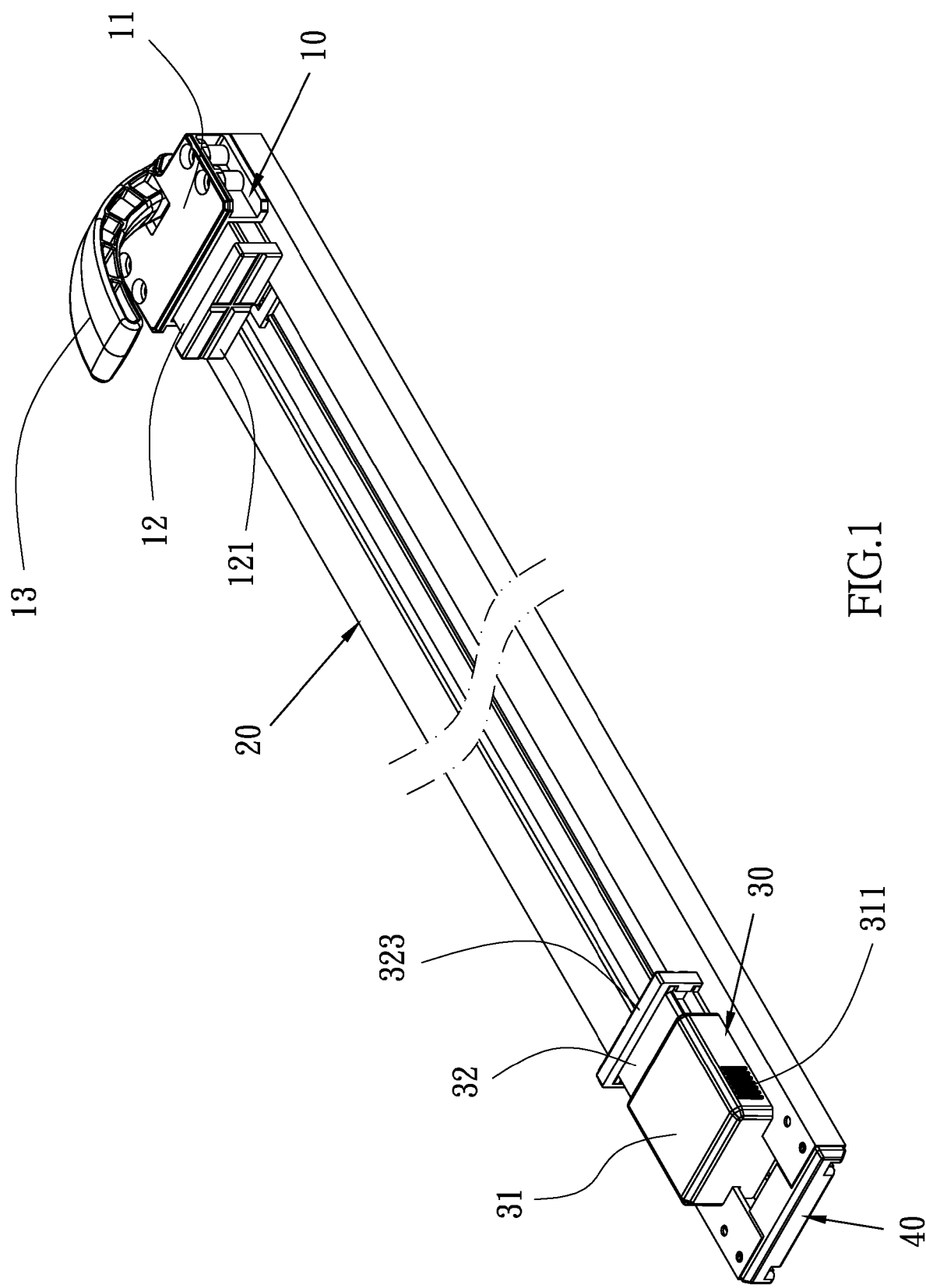
FIG. 1 is a perspective view of a grip vise according to the invention.
Figure 2:
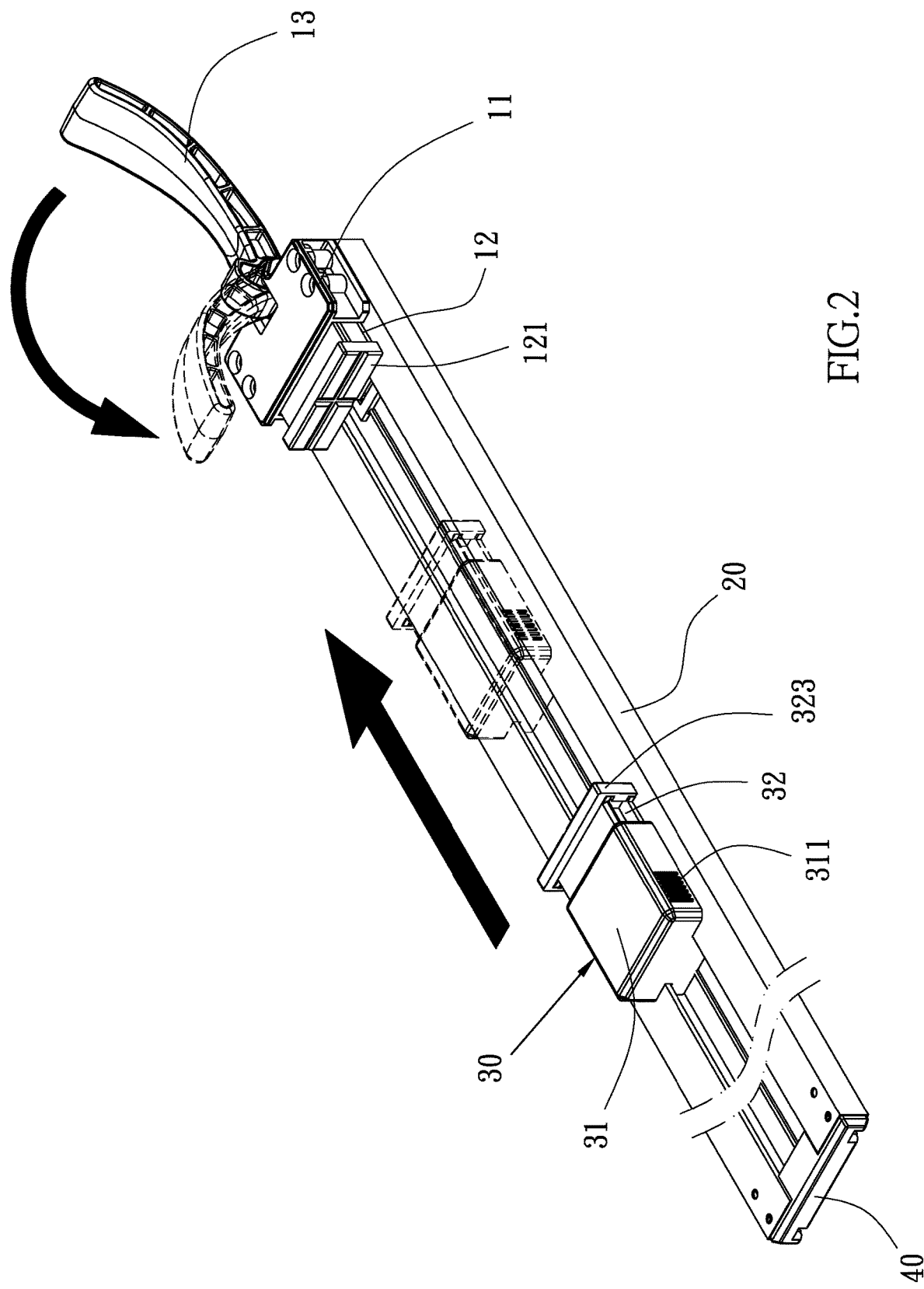
FIG. 2 is a view similar to FIG. 1 showing a clamping operation of the grip vise.
Figure 3:
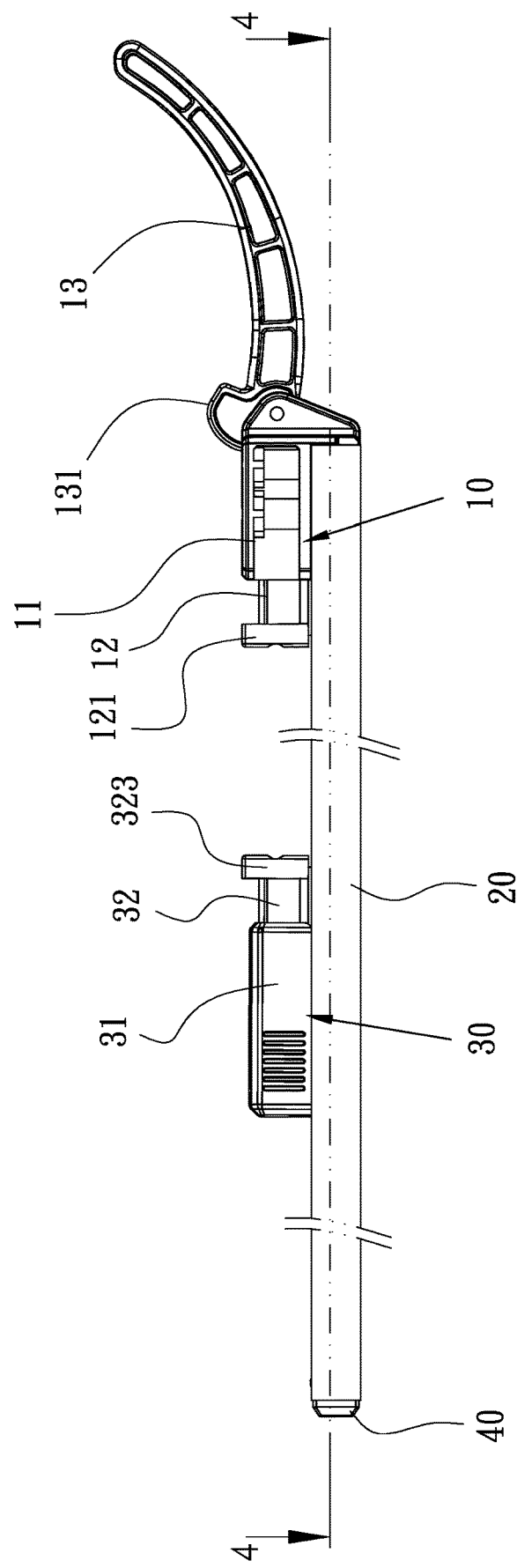
FIG. 3 is a side elevation of FIG. 2.
Figure 4:
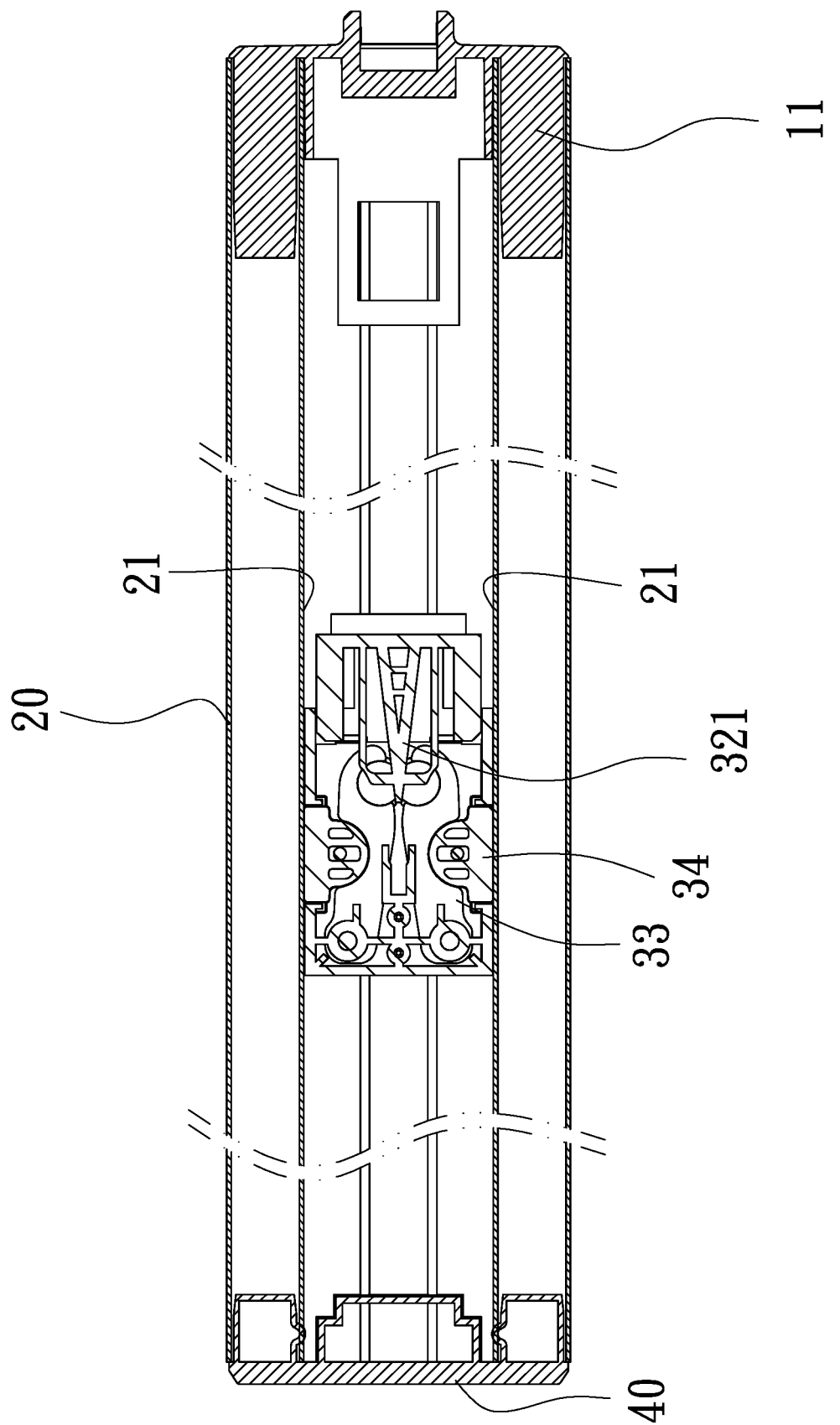
FIG. 4 is a sectional view taken along line 4-4 of FIG. 3.
Figure 5:
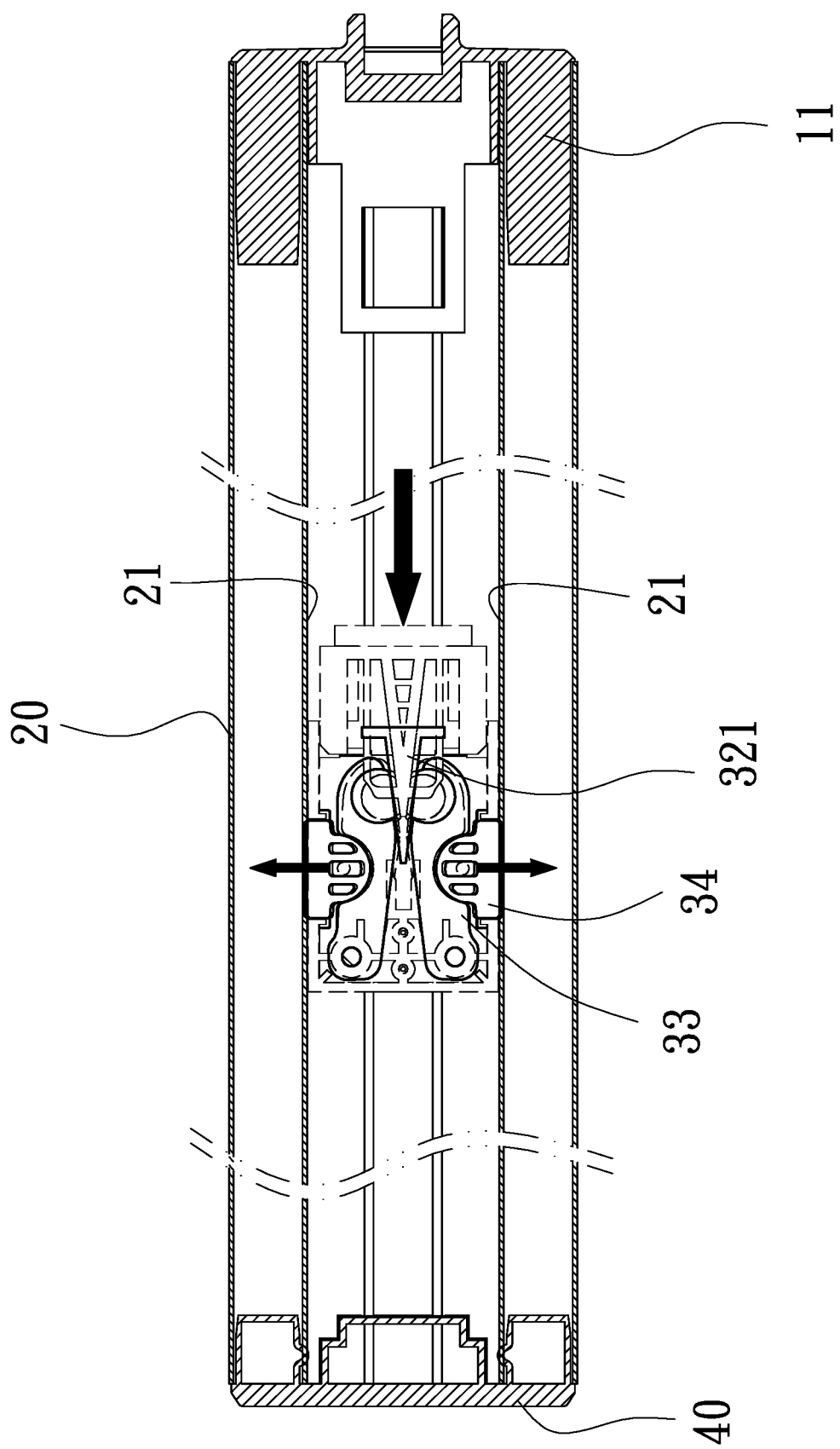
FIG. 5 is a view similar to FIG. 4 showing movement of the moveable jaw.
Figure 6:
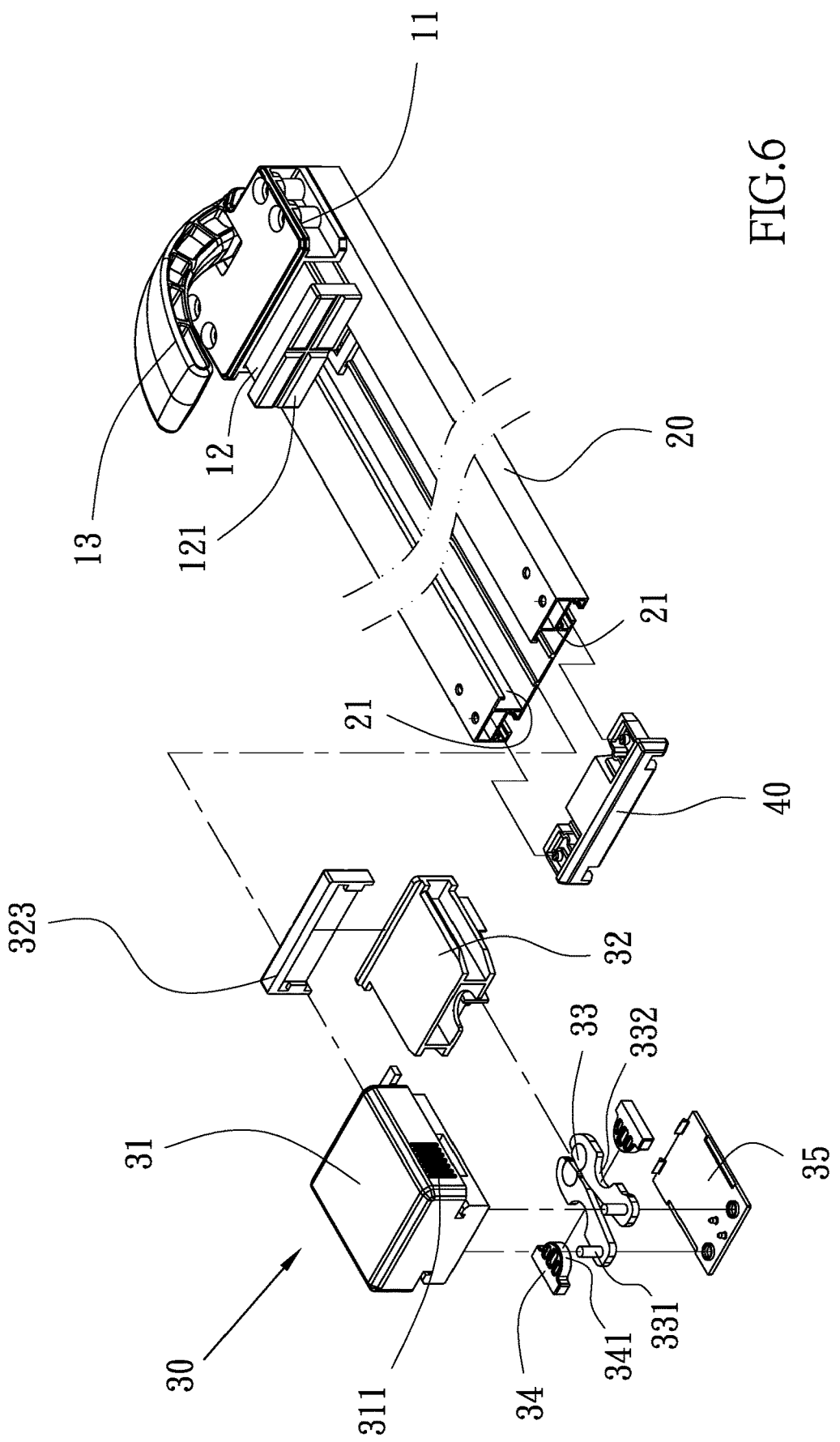
FIG. 6 is an exploded perspective view of the grip vise.
Figure 7:
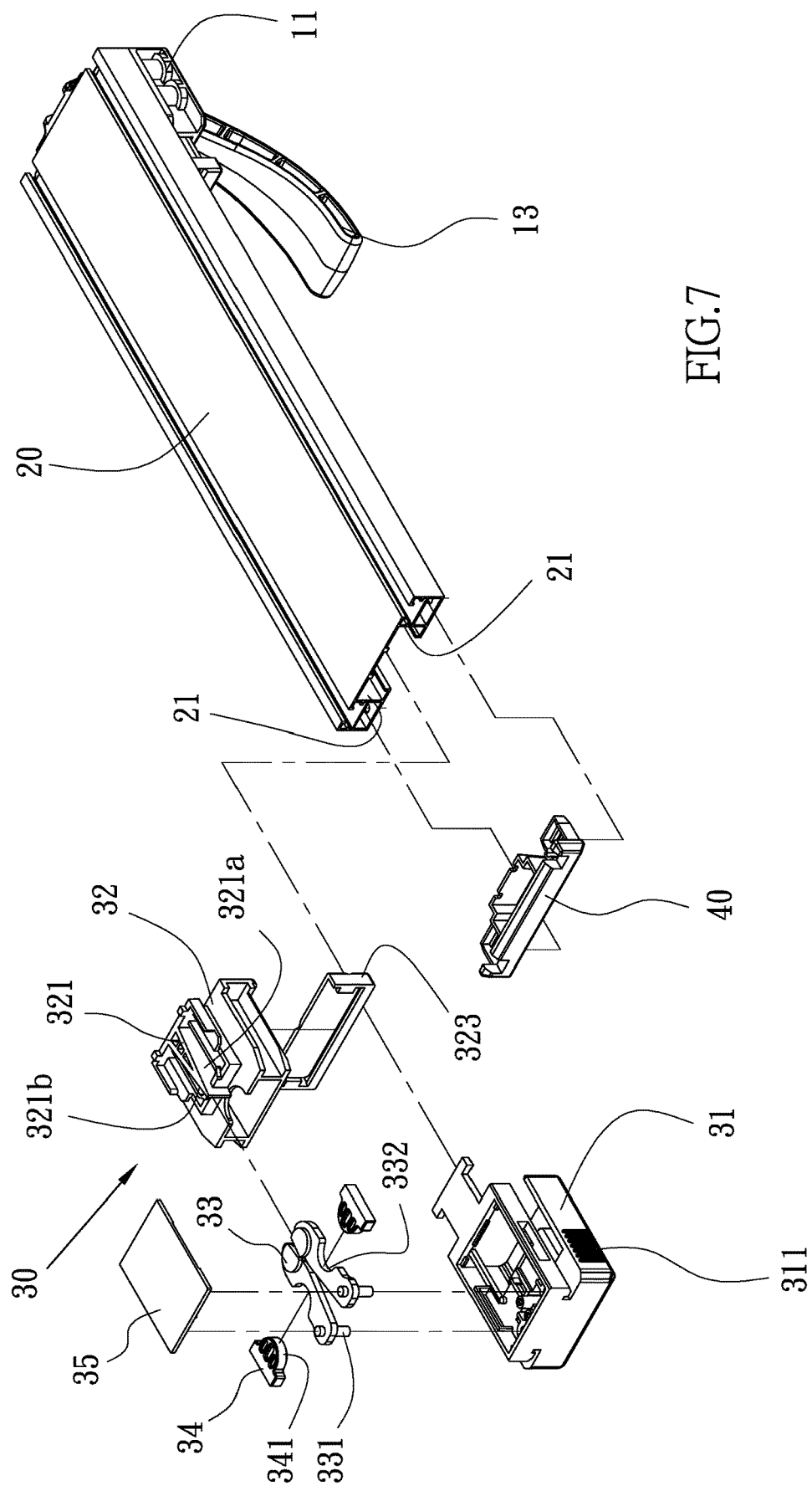
FIG. 7 is another exploded perspective view of the grip vise.
Figure 8:
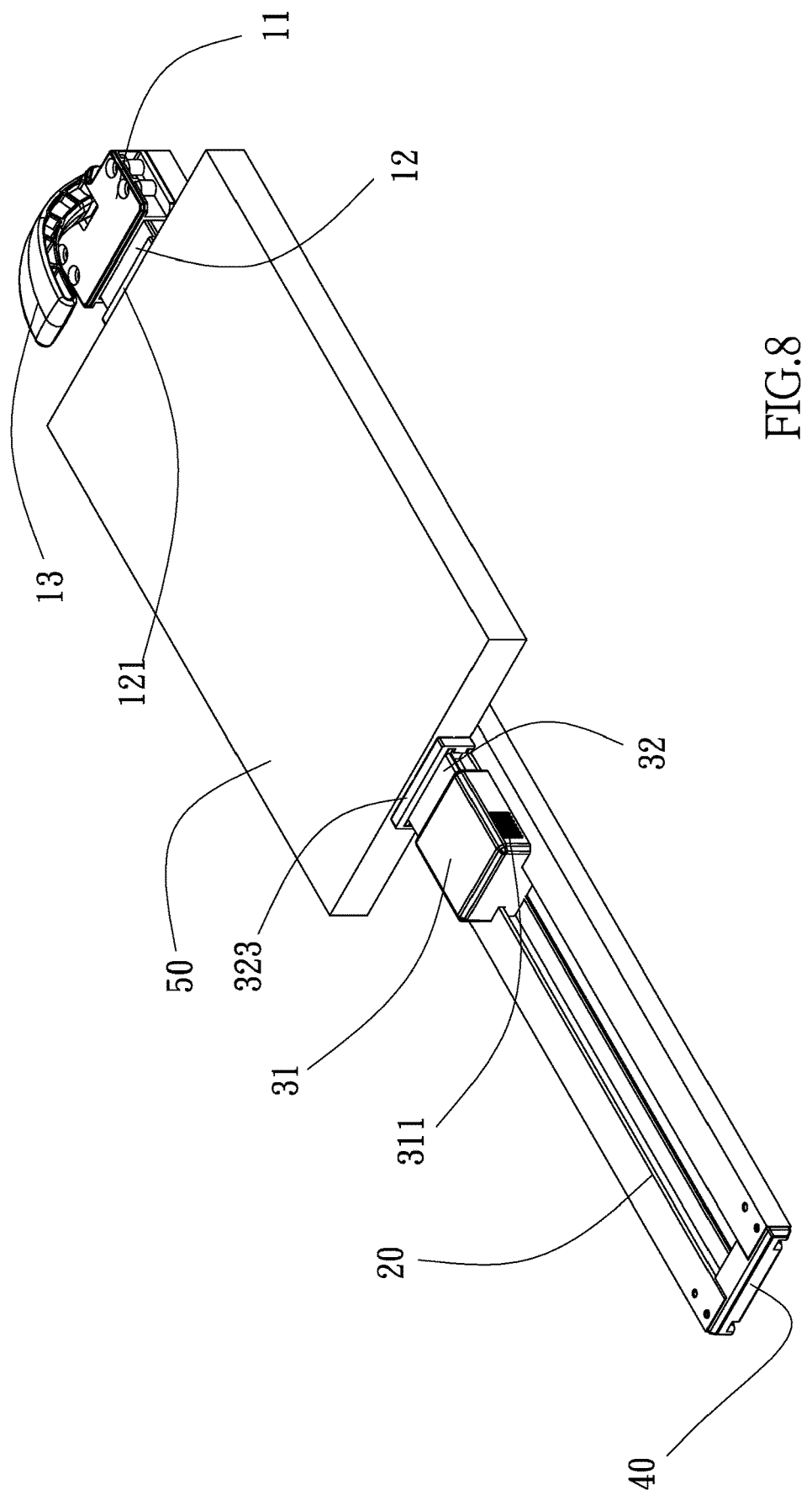
FIG. 8 is a perspective view showing a workpiece being clamped by the moveable jaw and the stationary jaw.
Figure 9:
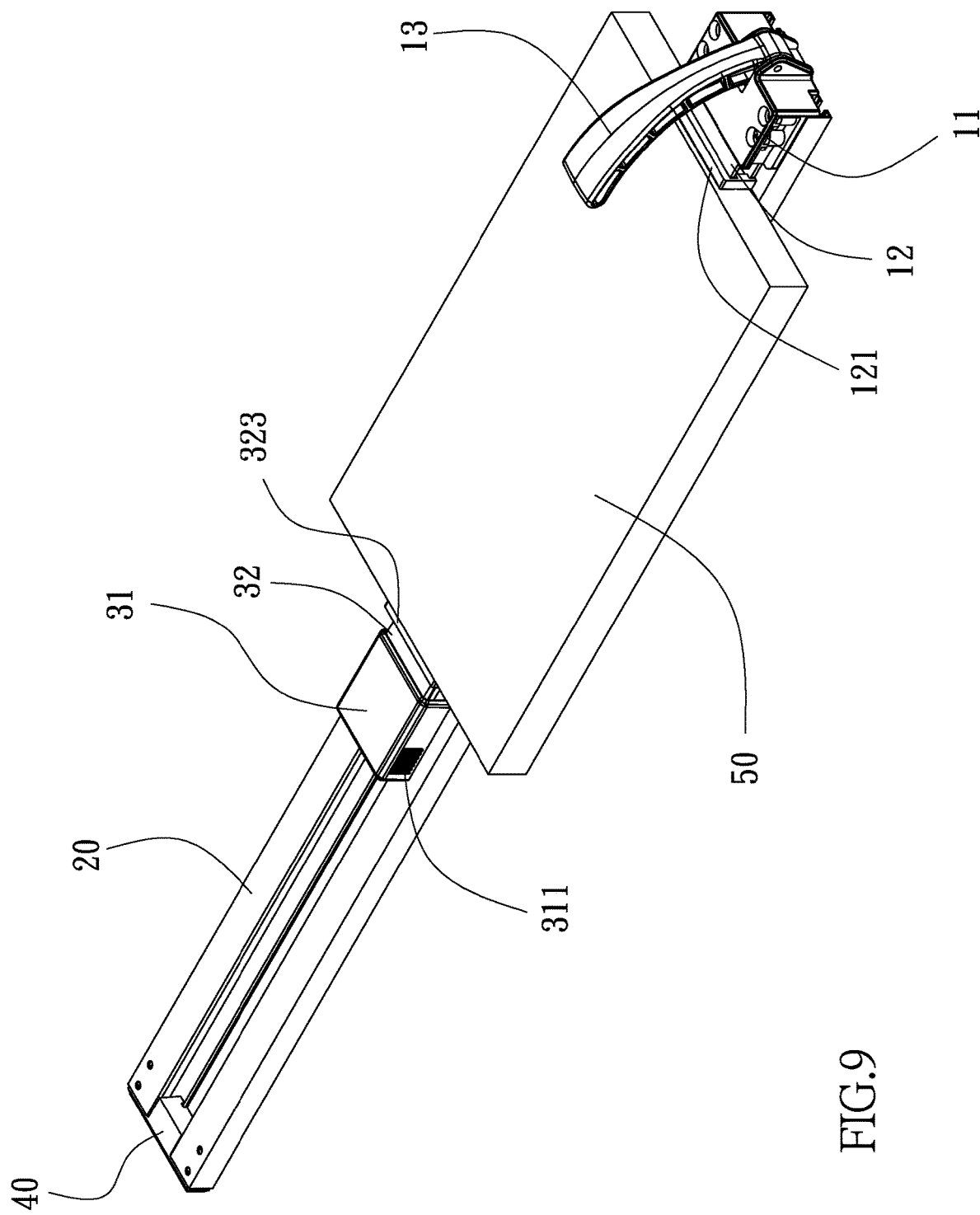
FIG. 9 is another perspective view of FIG. 8.

Referring to FIGS. 1 to 9, a grip vise in accordance with the invention comprises the following components as discussed in detail below.

A stationary jaw 10 is provided at one end of a rail 20 and includes a receptacle 11, a moveable jaw member 12 partially disposed in the receptacle 11 and having a clamping surface 121, and a lever 13 having a cam 131 at one end engaged with an end of the jaw member 12.

A limit member 40 is provided at the other end of the rail 20. A moveable jaw 30 is moveably disposed on the rail 20 and includes a moveable member 31 engaging with the limit member 40 in an inoperative position, the moveable member 31 having two knurled elements 311 on two sides respectively; a jaw member 32 having one end secured to the moveable member 31 and having a clamping surface 323 at the other end, an internal moveable wedge 321 secured to the clamping surface 323 and having a first inclined surface 321a and a second inclined surface 321b; two opposite arms 33 pivotably secured to the moveable member 31 by means of two pivots 331 respectively, one ends of the arms 33 contacted each other and engaged with the first inclined surface 321a and the second inclined surface 321b respectively, each arm 33 having a cavity 332 on an outer edge; two urging blocks 34 having a projection 341 complimentarily engaging the adjacent cavity 332, an outer edge of the urging block 34 engaging either inner side surface 21 of the rail 20; and a cover 35 secured to a bottom of the moveable member 31.

In a clamping operation, an individual may place a workpiece 50 on the rail 20 to have one end engaging the clamping surface 121. Next, the individual may use the one hand to grip the knurled elements 311 and use the same hand to push the moveable jaw 30 toward the stationary jaw 10 until the workpiece 50 engages with the clamping surface 323 of the moveable jaw 30. Next, the individual may pivot the lever 13 toward the moveable jaw 30 to cause the cam 131 to push the jaw member 12. And in turn, the workpiece 50 moves toward the moveable jaw 30 to move a sharp end of the wedge 321 into a space defined by the arms 33. Thus, the first inclined surface 321a and the second inclined surface 321b push the arms 33 away from each other. And in turn, the arms 33 push the urging blocks 34 laterally. As such, the urging blocks 34 urge against the inner side surfaces 21 of the rail 20 respectively. As a result, the workpiece 50 is clamped by the moveable jaw 30 and the stationary jaw 10.

While the invention has been described in terms of preferred embodiments, those skilled in the art will recognize that the invention can be practiced with modifications within the spirit and scope of the appended claims.

What is claimed is:

1. A vise, comprising:
a rail, wherein the rail includes two inner side surfaces;
a stationary jaw secured to one end of the rail and including a receptacle, a moveable jaw member partially disposed in the receptacle and having a clamping surface, and a lever having a cam at one end engaged with an end of the moveable jaw member;
a limit member disposed at the other end of the rail; and
a moveable jaw moveably disposed on the rail and including a moveable member engaging with the limit member in an inoperative position; a jaw element having one end secured to the moveable member and having a clamping surface at the other end, an internal moveable wedge secured to the clamping surface of the jaw element and having a first inclined surface and a second inclined surface; two opposite arms pivotably secured to the moveable member wherein one end of each of the arms contact each other and said one end of each of the arms each respectively engage with one of the first inclined surface and the second inclined surface, and each arm has a cavity on an outer edge of said arm; and two urging blocks having a projection each complimentarily engaging a respective cavity wherein an outer edge of each urging block engages a respective one of said inner side surfaces of the rail.

* * * * *